(12) United States Patent
Melton et al.

(10) Patent No.: US 9,366,439 B2
(45) Date of Patent: Jun. 14, 2016

(54) COMBUSTOR END COVER WITH FUEL PLENUMS

(71) Applicant: General Electric Company, Schenectady, NY (US)

(72) Inventors: Patrick Benedict Melton, Horse Shoe, NC (US); Gregory Allen Boardman, Greer, SC (US); James Harold Westmoreland, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 440 days.

(21) Appl. No.: 13/797,883

(22) Filed: Mar. 12, 2013

(65) Prior Publication Data

US 2014/0260267 A1    Sep. 18, 2014

(51) Int. Cl.
*F23R 3/28* (2006.01)
*F23R 3/10* (2006.01)

(52) U.S. Cl.
CPC .. *F23R 3/283* (2013.01); *F23R 3/10* (2013.01)

(58) Field of Classification Search
CPC ............ F23R 3/283; F23R 3/286; F23R 3/28; F23R 3/60; F23R 3/10
See application file for complete search history.

(56) References Cited

U.S. PATENT DOCUMENTS

| | | | |
|---|---|---|---|
| 1,855,165 A | 4/1932 | Barker | |
| 2,564,042 A | 8/1951 | Walker | |
| 3,581,492 A | 6/1971 | Norgren et al. | |
| 4,408,461 A | 10/1983 | Bruhwiler et al. | |
| 4,763,481 A | 8/1988 | Cannon | |
| 5,121,597 A * | 6/1992 | Urushidani et al. | 60/778 |
| 5,235,814 A * | 8/1993 | Leonard | 60/738 |
| 5,274,991 A | 1/1994 | Fitts | |
| 5,361,586 A | 11/1994 | McWhirter et al. | |
| 5,410,884 A * | 5/1995 | Fukue et al. | 60/267 |
| 5,415,000 A * | 5/1995 | Mumford et al. | 60/747 |
| 5,611,196 A | 3/1997 | Wilson | |
| 5,675,971 A | 10/1997 | Angel et al. | |
| 5,901,555 A | 5/1999 | Mandai et al. | |
| 5,927,076 A | 7/1999 | Pillsbury | |
| 5,943,866 A | 8/1999 | Lovett et al. | |
| 6,016,658 A | 1/2000 | Willis et al. | |
| 6,038,861 A * | 3/2000 | Amos et al. | 60/737 |
| 6,164,055 A | 12/2000 | Lovett et al. | |
| 6,351,948 B1 | 3/2002 | Goeddeke | |
| 6,360,776 B1 | 3/2002 | McCormick et al. | |
| 6,363,724 B1 | 4/2002 | Bechtel et al. | |
| 6,438,961 B2 | 8/2002 | Tuthill et al. | |
| 6,530,222 B2 * | 3/2003 | Stuttaford et al. | 60/737 |
| 6,532,742 B2 | 3/2003 | Scarinci et al. | |
| 6,832,483 B2 | 12/2004 | Moriya et al. | |
| 6,880,340 B2 | 4/2005 | Saitoh | |
| 6,928,823 B2 | 8/2005 | Inoue et al. | |

(Continued)

OTHER PUBLICATIONS

U.S. Appl. No. 13/797,848, filed Mar. 12, 2013, Boardman et al.

(Continued)

*Primary Examiner* — Carlos A Rivera
(74) *Attorney, Agent, or Firm* — Fletcher Yoder, P.C.

(57) ABSTRACT

A system includes a system having an end cover of a combustor for a gas turbine. The end cover has at least one fuel plenum coupled to a plurality of fuel injectors for a multi-tube fuel nozzle having a plurality of fuel-air mixing tubes, each tube having one of the fuel injectors. At least one fuel plenum is configured to provide fuel to each of the fuel injectors.

14 Claims, 7 Drawing Sheets

(56) References Cited

U.S. PATENT DOCUMENTS

| | | |
|---|---|---|
| 7,007,486 B2 | 3/2006 | Sprouse et al. |
| 7,134,287 B2 * | 11/2006 | Belsom et al. ............... 60/800 |
| 7,171,813 B2 | 2/2007 | Tanaka et al. |
| 7,181,916 B2 | 2/2007 | Ziminsky et al. |
| 7,284,378 B2 | 10/2007 | Amond, III et al. |
| 7,469,544 B2 | 12/2008 | Farhangi |
| 7,578,130 B1 | 8/2009 | Kraemer et al. |
| 7,841,180 B2 | 11/2010 | Kraemer et al. |
| 7,841,182 B2 | 11/2010 | Martin |
| 7,900,456 B2 | 3/2011 | Mao |
| 8,042,339 B2 | 10/2011 | Lacy et al. |
| 8,065,880 B2 | 11/2011 | Ishizaka et al. |
| 8,079,218 B2 | 12/2011 | Widener |
| 8,104,291 B2 | 1/2012 | Myers et al. |
| 8,122,721 B2 * | 2/2012 | Johnson et al. ............... 60/742 |
| 8,205,452 B2 | 6/2012 | Boardman et al. |
| 8,234,871 B2 | 8/2012 | Davis, Jr. et al. |
| 8,240,151 B2 | 8/2012 | Pelletier et al. |
| 8,266,912 B2 | 9/2012 | Berry et al. |
| 8,276,385 B2 | 10/2012 | Zuo et al. |
| 8,327,642 B2 | 12/2012 | Uhm et al. |
| 8,402,763 B2 | 3/2013 | Mulherin et al. |
| 8,408,004 B2 | 4/2013 | Davis, Jr. et al. |
| 8,438,853 B2 | 5/2013 | Green et al. |
| 8,474,265 B2 | 7/2013 | Jain et al. |
| 8,484,978 B2 | 7/2013 | Bailey et al. |
| 8,505,304 B2 | 8/2013 | Myers et al. |
| 8,522,555 B2 | 9/2013 | Berry et al. |
| 8,528,336 B2 | 9/2013 | Cihlar et al. |
| 8,528,839 B2 | 9/2013 | Bailey et al. |
| 8,572,979 B2 | 11/2013 | Smith et al. |
| 8,616,002 B2 | 12/2013 | Kraemer et al. |
| 8,789,372 B2 | 7/2014 | Johnson et al. |
| 8,800,289 B2 | 8/2014 | Johnson et al. |
| 8,850,821 B2 | 10/2014 | Khan et al. |
| 8,919,127 B2 | 12/2014 | Melton et al. |
| 8,966,909 B2 | 3/2015 | Crothers et al. |
| 9,032,704 B2 | 5/2015 | Crothers et al. |
| 9,151,502 B2 | 10/2015 | Crothers et al. |
| 9,163,839 B2 | 10/2015 | Westmoreland et al. |
| 9,200,571 B2 | 12/2015 | Bailey et al. |
| 9,255,711 B2 | 2/2016 | Crothers et al. |
| 2002/0128790 A1 | 9/2002 | Woodmansee |
| 2004/0163392 A1 | 8/2004 | Nishida et al. |
| 2008/0110172 A9 * | 5/2008 | Bruck ............... 60/723 |
| 2009/0241547 A1 | 10/2009 | Luts et al. |
| 2010/0089065 A1 * | 4/2010 | Tuthill ............... 60/737 |
| 2010/0192579 A1 * | 8/2010 | Boardman et al. ............... 60/737 |
| 2010/0192583 A1 | 8/2010 | Cano Wolff et al. |
| 2010/0205970 A1 | 8/2010 | Hessler et al. |
| 2010/0218501 A1 * | 9/2010 | York et al. ............... 60/737 |
| 2010/0263384 A1 | 10/2010 | Chila |
| 2011/0016866 A1 * | 1/2011 | Boardman et al. ............... 60/730 |
| 2011/0113783 A1 * | 5/2011 | Boardman et al. ............... 60/723 |
| 2011/0209481 A1 | 9/2011 | Simmons |
| 2012/0047902 A1 * | 3/2012 | Tuthill ............... 60/740 |
| 2012/0174590 A1 * | 7/2012 | Krull et al. ............... 60/772 |
| 2012/0180487 A1 | 7/2012 | Uhm et al. |
| 2012/0180488 A1 | 7/2012 | Bailey et al. |
| 2012/0227371 A1 | 9/2012 | Johnson et al. |
| 2012/0279224 A1 * | 11/2012 | Bailey et al. ............... 60/746 |
| 2013/0074503 A1 | 3/2013 | Rohrssen et al. |
| 2013/0125548 A1 * | 5/2013 | Dutta et al. ............... 60/723 |
| 2013/0125549 A1 | 5/2013 | Bailey et al. |
| 2013/0180256 A1 | 7/2013 | Stoia |
| 2013/0232977 A1 | 9/2013 | Siddagangaiah et al. |
| 2014/0260267 A1 | 9/2014 | Melton et al. |
| 2014/0260268 A1 | 9/2014 | Westmoreland et al. |
| 2014/0260299 A1 | 9/2014 | Boardman et al. |
| 2014/0283522 A1 | 9/2014 | Boardman et al. |
| 2014/0338338 A1 | 11/2014 | Chila et al. |

OTHER PUBLICATIONS

U.S. Appl. No. 13/797,859, filed Mar. 12, 2013, Boardman et al.
U.S. Appl. No. 13/797,896, filed Mar. 12, 2013, Westmoreland et al.
U.S. Appl. No. 13/797,912, filed Mar. 12, 2013, Chila et al.
U.S. Appl. No. 13/797,925, filed Mar. 12, 2013, Westmoreland et al.
U.S. Appl. No. 13/797,961, filed Mar. 12, 2013, Westmoreland et al.
U.S. Appl. No. 13/797,986, filed Mar. 12, 2013, Chila et al.
U.S. Appl. No. 13/798,012, filed Mar. 12, 2013, Melton et al.
U.S. Appl. No. 13/798,027, filed Mar. 12, 2013, Westmoreland et al.
U.S. Appl. No. 13/400,248, filed Feb. 20, 2012, Westmoreland et al.
U.S. Appl. No. 13/705,443, filed Dec. 5, 2012, Belsom et al.

* cited by examiner

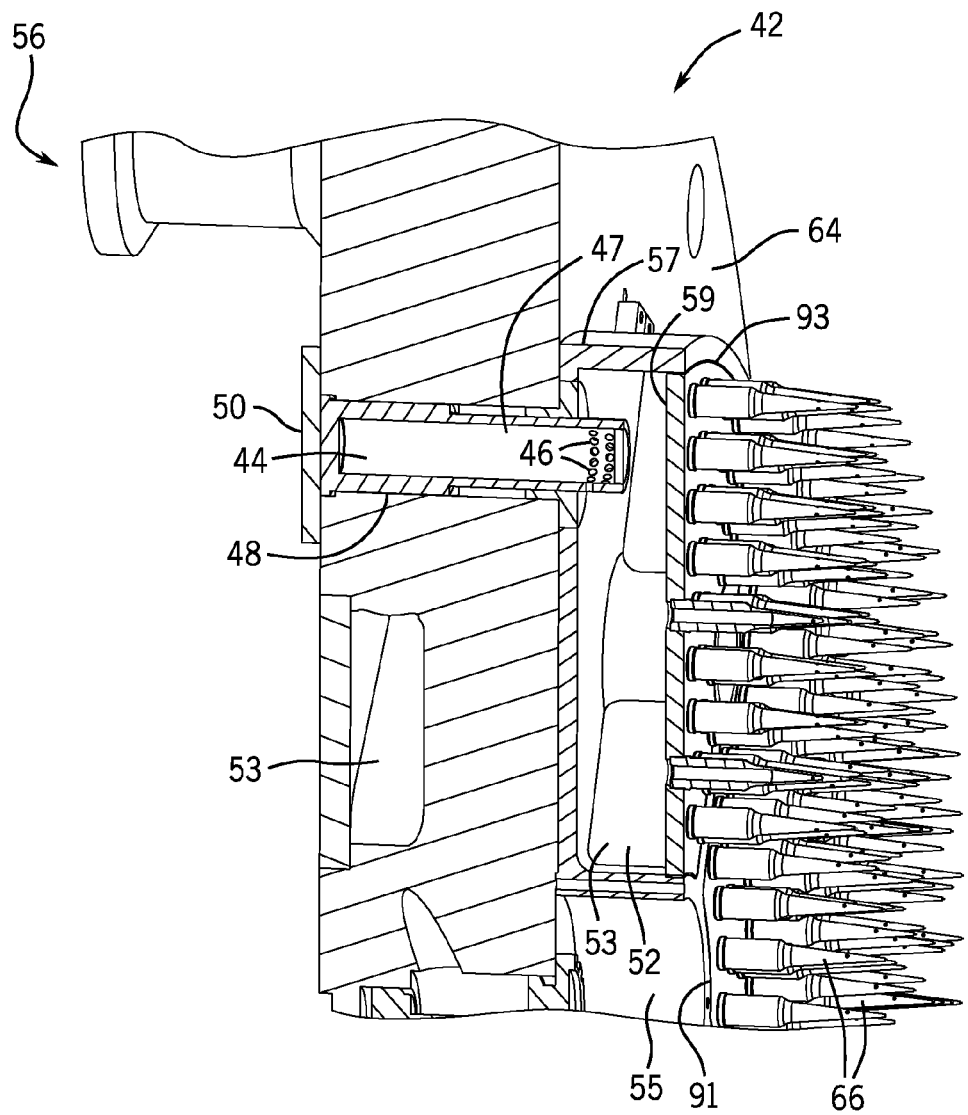
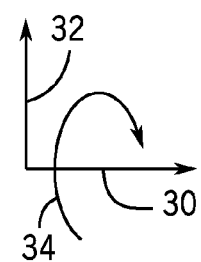
FIG. 4

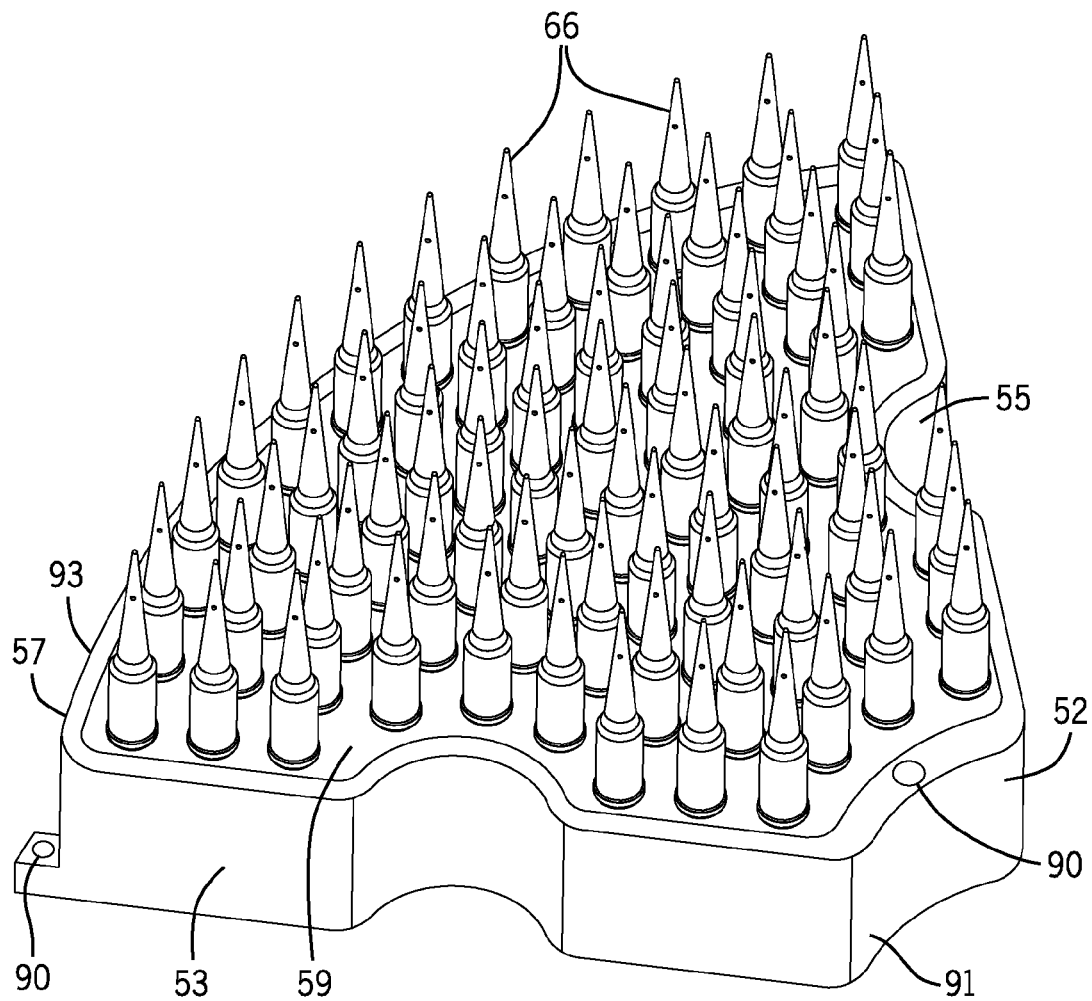
FIG. 7
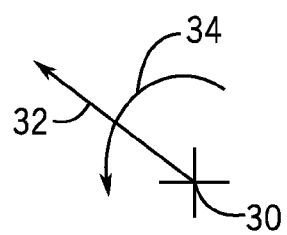

COMBUSTOR END COVER WITH FUEL PLENUMS

BACKGROUND OF THE INVENTION

The subject matter disclosed herein relates generally to turbine combustors, and, more particularly, to an end cover for the turbine combustors.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes a fuel nozzle assembly, e.g., with multiple fuel nozzles, to inject fuel and air into a combustor. The design and construction of the fuel nozzle assembly can significantly affect the mixing and combustion of fuel and air, which in turn can impact exhaust emissions (e.g., nitrogen oxides, carbon monoxide, etc.) and power output of the gas turbine engine. Furthermore, the design and construction of the fuel nozzle assembly can significantly affect the time, cost, and complexity of installation, removal, maintenance, and general servicing. Therefore, it would be desirable to improve the design and construction of the fuel nozzle assembly. For example, it would be desirable to improve the fuel supply system for the fuel nozzle assembly, e.g., simplify the fuel supply paths and connections.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a system having an end cover of a combustor for a gas turbine. The end cover has at least one fuel plenum coupled to a plurality of fuel injectors for a multi-tube fuel nozzle that has a plurality of fuel-air mixing tubes. Each fuel-air mixing tube has one of the fuel injectors. At least one fuel plenum is configured to provide fuel to each of the fuel injectors.

In a second embodiment, a system includes an end cover of a combustor. The end cover has at least one fuel plenum integral to the end cover and coupled to at least one fuel injector for a multi-tube fuel nozzle having a plurality of fuel-air mixing tubes, each tube having one of the fuel injectors. At least one fuel plenum is configured to provide fuel to at least one fuel injector.

In a third embodiment, a system includes at least one fuel plenum configured to attach to an end cover of a gas turbine, and at least one fuel plenum is coupled to a plurality of fuel injectors for a multi-tube fuel nozzle. At least one fuel plenum is configured to provide fuel to the plurality of fuel injectors.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a cross-sectional side view of a portion of an embodiment of an end cover having a detachable fuel plenum;

FIG. 7 is a perspective view of a detached fuel plenum.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems for an end cover of a combustor for a gas turbine having at least one fuel plenum coupled to a plurality of fuel injectors for a multi-tube fuel nozzle. The fuel plenum is configured to provide fuel to each of the fuel injectors, which may be brazed or threaded onto the fuel plenum. In certain embodiments, the fuel plenum may be either detachable from or integral to the end cover, and may be partially defined by a cavity within the end cover. Furthermore, the fuel plenum may extend in a circumferential direction about a central axis of the end cover. The presently described systems may provide lower manufacturing costs, easier repair procedures, longer equipment lifetime, and/or lower emissions, for example.

Figure 1:
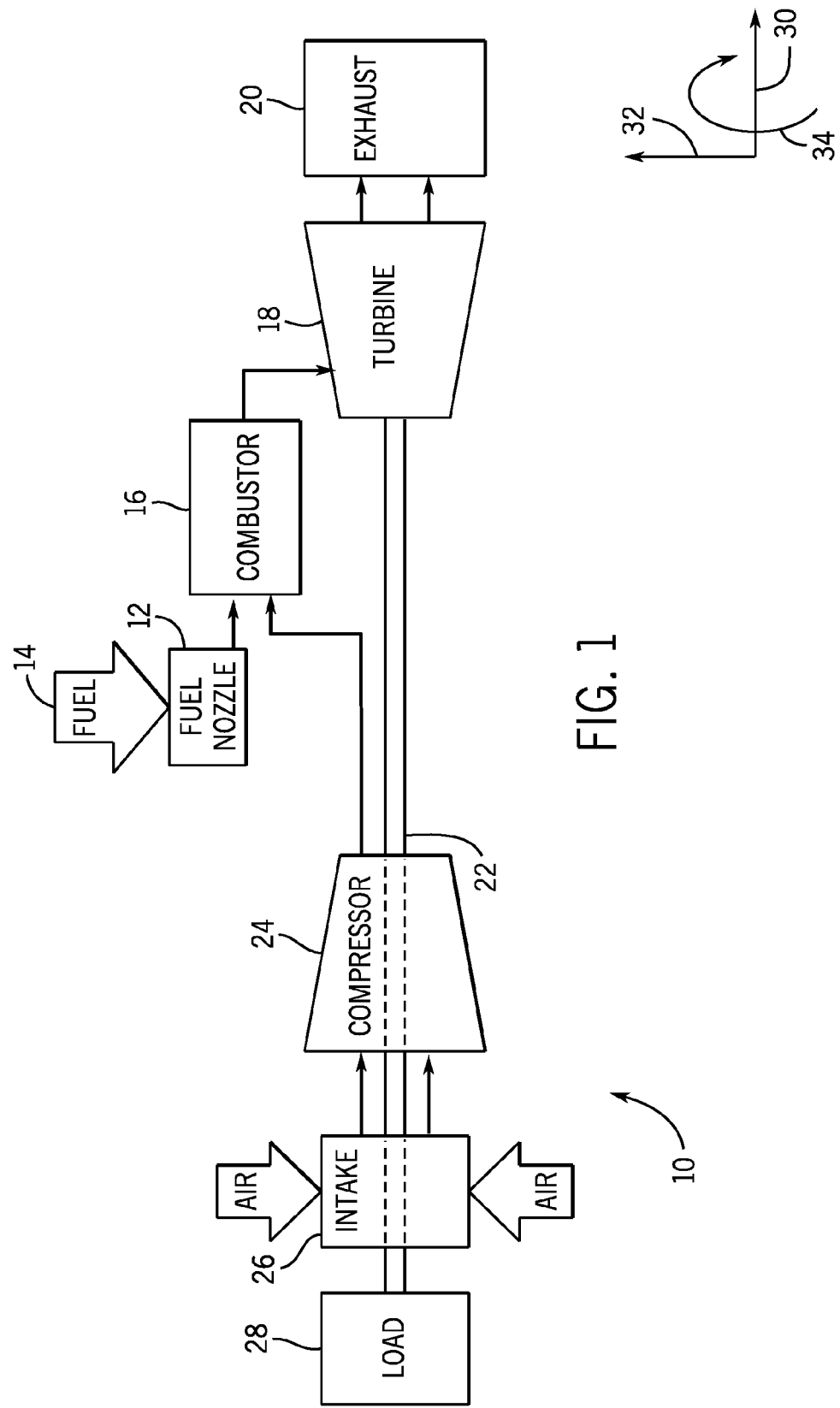
FIG. 1 is a block diagram of an embodiment of a turbine system having a multi-tube fuel nozzle.

Turning to the drawings, FIG. 1 is a block diagram of an embodiment of a turbine system 10. As described in detail below, the disclosed turbine system 10 (e.g., a gas turbine engine) may employ an end cover with fuel plenums, described below, which may improve fuel distribution and improve system durability, operability, and reliability. The turbine system 10 may use liquid or gas fuel, such as natural gas and/or a hydrogen rich synthetic gas, to drive the turbine system 10. As depicted, fuel nozzles 12 (e.g., multi-tube fuel nozzles) intake a fuel supply 14, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 12 distribute the fuel-air mixture into a combustor 16 in a suitable ratio for optimal combustion, emissions, fuel consumption, and power output.

The turbine system 10 may include one or more fuel nozzles 12 located inside one or more combustors 16. The fuel-air mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10. The turbine system 10 may extend along an axial axis or direction 30, a radial axis or direction 32 toward or away from the axis 30, and a circumferential axis or direction 34 around the axis 30. The fuel nozzle 12 may contain or connect with an end cover having fuel plenum 52, described below, which may improve fuel distribution by feeding fuel directly into fuel injectors, which may feed fuel into tubes where it premixes with air before being released to the combustor 16.

Figure 2:
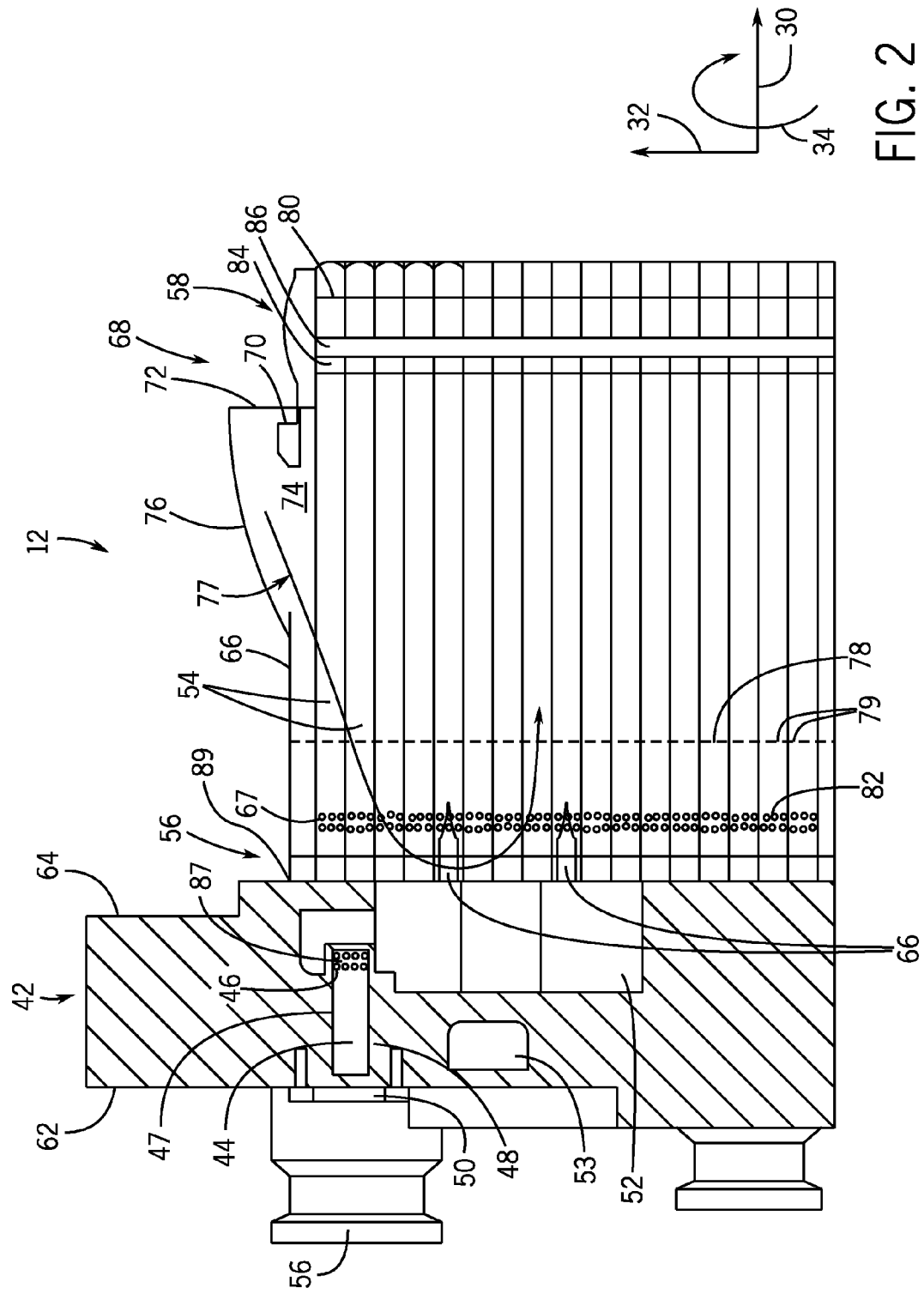
FIG. 2 is a cross-sectional side view of a portion of a combustor having the multi-tube fuel nozzle of FIG. 1 coupled to an end cover of the combustor.

FIG. 2 is a cross-sectional side view of a portion of the multi-tube fuel nozzle 12 coupled to the end cover 42. As shown, the end cover 42 may include a pre-orifice conduit 44 having apertures 46, a pre-orifice cavity 48, a pre-orifice cover 50, a fuel plenum 52, a fuel manifold 53, and a fuel inlet 56. Fuel 14 enters through the fuel inlet 56 and passes through the fuel manifold 53 to the pre-orifice conduit 44, which may fit inside the pre-orifice cavity 48 and may extend along the axial axis 30. A volume of fuel 14 flows through the pre-orifice conduit 44 toward the apertures 46 on a downstream end 47 of the pre-orifice conduit 44, which may extend into the fuel plenum 52. The fuel 14 may then flow through the apertures 46 into the fuel plenum 52. The apertures 46 in the conduit 44 may be of any of a variety of shapes and sizes, and may generally provide additional diffusion and distribution of the fuel 14, so as to improve distribution of the fuel 14 to the fuel plenum 52. From the fuel plenum 52, the fuel 14 may be distributed to a series of fuel injectors 66, and into the fuel nozzle 12.

As shown in FIG. 2, the fuel nozzle 12 (e.g., multi-tube fuel nozzle) includes a plurality of mixing tubes 54 (e.g., 10 to 1000, 20 to 500, or 30 to 100 tubes 54), a first end 68, an air diffuser 76, and a cap 80. Pressurized air 70 may enter the first end 68 of the fuel nozzle 12 through an air inlet 72. More specifically, pressurized air 70 may flow through the air inlet 72 into an air cavity 74 within the first end 68. The air cavity 74 consists of the volume of space within the first end 68 between and around the plurality of mixing tubes 54, and the pressurized air 70 spreads throughout the air cavity 74 and flows to each of the plurality of mixing tubes 54. In some embodiments, the diffuser 76 may be provided to improve distribution of the pressurized air 70 within the first end 68. The diffuser 76 may be an annular flow conditioning diffuser configured to distribute the pressurized air 70 forward (e.g., towards to fuel plenum 52), radially inward, and/or externally across the plurality of mixing tubes 54 as shown by arrow 77. The pressurized air 70 may enter each mixing tube 54 through one or more apertures 82 in the mixing tubes 54, so that the pressurized air 70 may mix with the fuel 14 in the mixing tubes 54 to create a fuel-air mixture. The fuel-air mixture may then pass downstream inside the mixing tubes 54, toward the combustion zone. In some embodiments, the diffuser 76 may diffuse the pressurized air 70 such that the pressurized air 70 is substantially evenly distributed to each mixing tube 54. Additionally or alternatively, a perforated air distribution plate 78, indicated by a dashed line in FIG. 2, may be provided within the fuel nozzle 12, and the air distribution plate 78 may generally be positioned between the end cover 42 and the cap 80. A plurality of perforations 79 in the air distribution plate 78 may be of any of a variety of shapes and sizes, and may generally provide additional diffusion and distribution of the pressurized air 70, so as to improve distribution of the pressurized air 70 to the mixing tubes 54.

In some embodiments, the fuel nozzle 12 also has a retainer 84 and/or an impingement plate 86. The retainer 84 and/or the impingement plate 86 may be positioned downstream of the fuel injectors 66 and generally proximate to the cap 80. In some embodiments, the cap 80, the retainer 84, and/or the impingement plate 86 may be removable or separable from the support structure 66, for example. The retainer 84 and/or the impingement plate 86 may provide support for the mixing tubes 54. The impingement plate 86 may additionally or alternatively be configured to provide for impingement cooling of the cap 80 within the combustor 16. Thus, the plate 86 may include a plurality of holes to direct or impinge jets of air onto a surface of the cap 80 for impingement cooling.

The end cover 42 may be coupled to the upstream end 56 of the fuel nozzle 12. Each fuel plenum 52 may fit within a cavity 87 within the end cover 42, and each plenum 52 may be fluidly connected to one or more fuel injectors 66. While only two fuel injectors 66 are shown in FIG. 2, it should be understood that each mixing tube 54 includes a respective fuel injector 66. In certain embodiments, the system 10 may include one, two, three, or more fuel plenums 52 that each provides fuel 14 to a subgroup of fuel injectors 66, and ultimately to the mixing tubes 54 associated with each fuel injector 66. For example, one fuel plenum 44 may provide fuel to about 5, 10, 50, 70, 100, 500, 1000, or more fuel injectors 66. In some embodiments, the combustor 16 may have subgroups of fuel injectors 66 supplied by different fuel plenums 52 to enable one or more subgroups of fuel injectors 66 and corresponding mixing tubes 54 to be run richer or leaner than others, which in turn may enable more control of the combustion process, for example. The fuel injectors 66 may be coupled to a support plate 89, which may further define the fuel plenum 52. The fuel plenums 52 may be radially 32 or circumferentially 34 arranged about a central or longitudinal axis 30 of the fuel nozzle 12, and the fuel plenums 52 may be integral or removably coupled (e.g., bolted, threaded, etc.) to the end cover 42 and supplied with fuel 14 by one or more pre-orifice conduits 44. Having multiple fuel plenums 52 may enable the use of multiple types of fuel 14 (e.g., at the same time) in the fuel nozzle 12. The injectors 66 may be removably attached (e.g., threaded, bolted, brazed, etc.) to the fuel plenums 52, and extend inside corresponding mixing tubes 54.

The end cover 42 may have two faces, a cold face 62 and a hot face 64. The cold face 62 may face upstream, away from the fuel injectors 66. The hot face 64 may face downstream, towards the mixing tubes 54 and the downstream side 58, and contain the fuel injectors 66. In some embodiments, the end cover 42 may be positioned upstream of, and proximate to, the upstream side 56 of the mixing tubes 54. The end cover 42 may include one or more fuel inlets 56 through which the fuel 14 is provided to one or more fuel plenums 52. The end cover 42 may be removable, and may furthermore enable access to individual fuel plenums 52 and pre-orifice conduits 44. The pre-orifice conduit 44 may be breech-loaded (e.g., loaded from the cold face 62 of the end cover 42) into the pre-orifice cavity 48. The pre-orifice conduit 44 may be removed from the cold face 62 of the end cover 42 to allow access to the fuel plenums 52. As discussed above, the fuel plenums 52 may allow for uniform fuel distribution to each fuel injector 66 and associated mixing tube 54, thereby reducing thermal strains in the end cover 42, reducing nitrogen oxides emissions, and reducing the life cycle costs of the turbine system 10.

Figure 3:
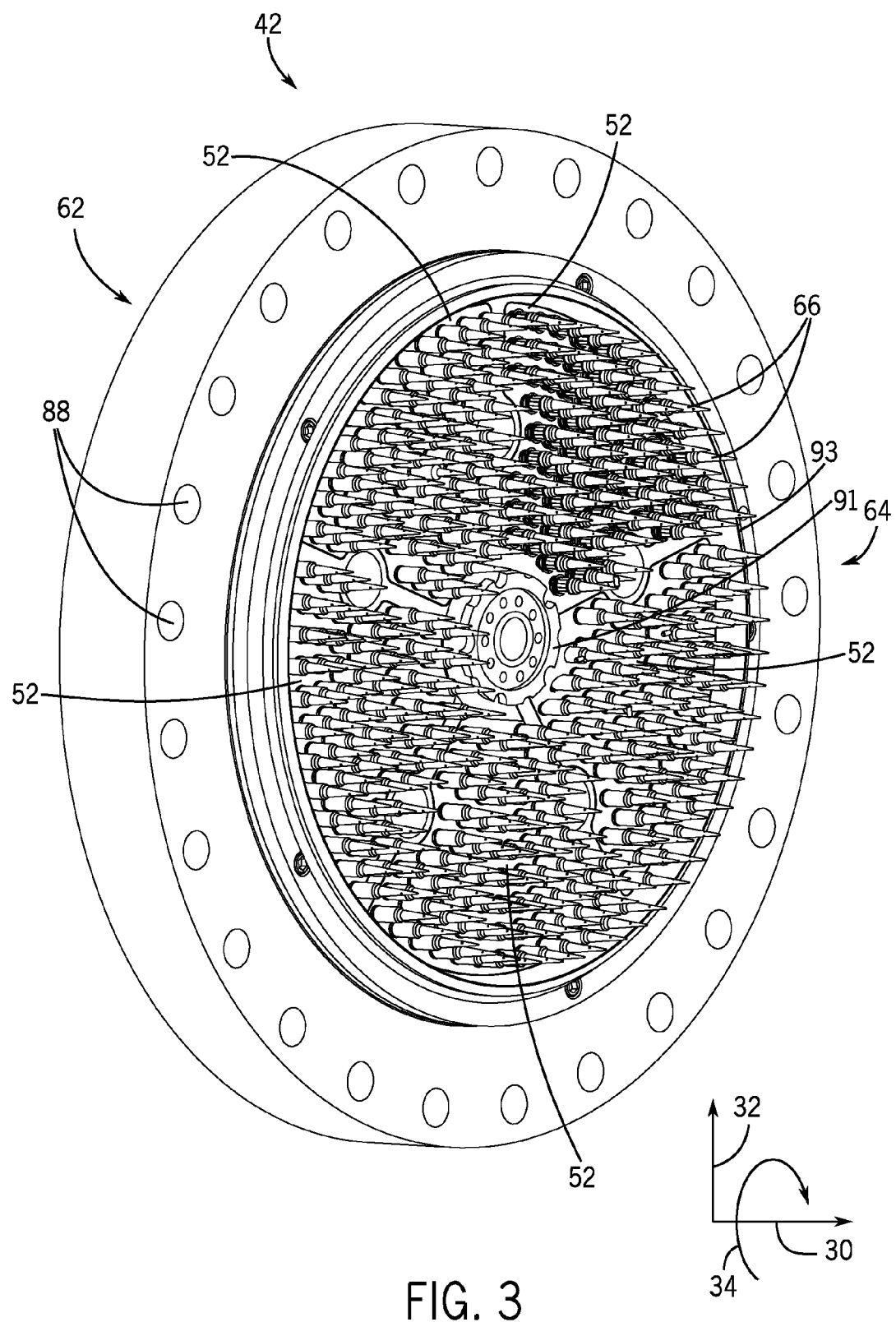
FIG. 3 is a perspective view of an embodiment of a removable end cover of a combustor having a fuel plenum.

FIG. 3 illustrates an embodiment of the hot face 64 of the end cover 42, having the fuel plenums 52. Specifically, FIG. 3 illustrates an embodiment having five fuel plenums 52, wherein each fuel plenum 52 is a wedge-shaped sector that extends circumferentially around the end cover 42, and each fuel plenum 52 supplies a subgroup of approximately 72 fuel injectors 66. The end cover 42 may include one or more fuel plenums 52, the plurality of pre-orifice conduits 44, the plurality of pre-orifice covers 50, and the plurality of fuel injectors 66. Because the hot face 64 of the end cover 42, shown in FIG. 3, contains the fuel injectors 66 and faces downstream, towards the combustion chamber of the combustor 16, it may be configured to reach a higher temperature relative to the second side of the end cover 42 (e.g., the cold face 62) during operation of the turbine 18. In certain embodiments, the pre-orifice conduits 44 may be configured to be breech-loaded into corresponding pre-orifice cavities 48 on the cold face 62 of the end cover 42. As described above, the pre-orifice conduits 44 may have apertures 46, and may be configured to be removed from the cold face 62, opposite the hot face 64 shown in FIG. A portion of at least one pre-orifice conduit 44 may extend into the fuel plenum 52, and may be further configured to provide fuel to the plenum 52.

The end cover 42 may contain one or more fuel plenums 52 (e.g., the end cover 42 may contain about 1, 5, 10, 20, or more fuel plenums 52), which may be integral with the end cover 42 or detachable. The fuel plenums 52 may be arranged circumferentially, radially, or in any other suitable arrangement on the hot face 64. For example, as shown in FIG. 3, the end cover 42 contains 5 fuel plenums 52 that extend circumferentially 34 about the hot face 62, and each fuel plenum 52 is a wedge-shaped sector that extends in a radial direction 32 from an inner circumference 91 to an outer circumference 93 of the end cover 42. Each fuel plenum 52 may be in fluid communication with one or more fuel injectors 66 (e.g., each fuel plenum 52 may supply a subgroup of fuel injectors 66, as described above). Specifically, FIG. 3 illustrates an embodiment having five fuel plenums 52, wherein each fuel plenum 52 supplies a subgroup of approximately 72 fuel injectors 66. The number of fuel injectors 66 on each fuel plenum 52 may vary. For example, each fuel plenum 52 may contain about 5, 10, 50, 100, 500, 1000, or more fuel injectors 66. The fuel injectors 66 may be threaded, bolted, brazed, or otherwise coupled to the fuel plenum 52, and they may be arranged circumferentially 34, as shown in FIG. 3, radially 32, or in any other suitable arrangement.

As noted above, the fuel plenums 52 may be fed fuel 14 by one or more removable, breech-loaded pre-orifice conduits 44 (e.g., the end cover 42 may contain about 5, 10, 50, 70, 100, or more pre-orifice conduits 44). Furthermore, as noted above, in certain embodiments, the fuel injectors 66 may be individually removable from the fuel plenum 52. In embodiments containing detachable fuel plenums 52, each detachable fuel plenums 52 (and its associated subgroup of fuel injectors 66) may be individually detached and removed from the end cover 42. In addition, the end cover 42 itself may be removably coupled to the fuel nozzle 12 (e.g., with bolts 88) and may be removed as whole. As a result, the end cover 42, having the fuel plenums 52, may provide multiple options for removing, inspecting, repairing, and/or replacing the passageways of the end cover 42 (e.g., pre-orifice conduits 44 and fuel plenums 52) and associated apparatuses (e.g. fuel injectors 66). The end cover 42 and fuel plenums 44 enable liquid cartridges, integral igniters, or some other protrusions to extend from the end cover 42 to the combustion zone. Furthermore, the end cover 42 with fuel plenums 52 may increase the uniformity of the fuel 14 distribution to the fuel injectors 66, reduce thermal strains in the end cover 42, and increase the operability, profitability, and reliability of the turbine system 10.

FIG. 4 is a perspective cross-sectional view of a portion of the end cover 42 containing the detachable fuel plenum 52, the pre-orifice conduit 44, and the fuel injectors 66. This embodiment may also include the fuel manifold 53, the fuel inlet 56, the pre-orifice cavity 48, and the pre-orifice cover 50. The fuel plenum 52 may have sides 53, 55, 57 and 59. The side 57 may extend circumferentially 34 to match the contours of the fuel nozzle 12. The fuel nozzle 12 may be couple to the side 59. As described above, the detachable fuel plenum 52 may be removably coupled (e.g., bolted, threaded, etc.) to the hot face 64 of the end cover 42. Fuel 14 may enter the end cover 42 through the fuel inlet 56, and pass through the fuel manifold 53 to the pre-orifice conduit 44, which may distribute the fuel 14 into the fuel plenum 52. The fuel plenum 52 may feed a plurality of fuel injectors 66. The detachable fuel plenum 52 may be removed from the hot face 64 of the end cover 42 in order to inspect, clean, or maintain the fuel plenum 52, the fuel injectors 66, the end cover 42 or the fuel nozzle 12.

Figure 5:
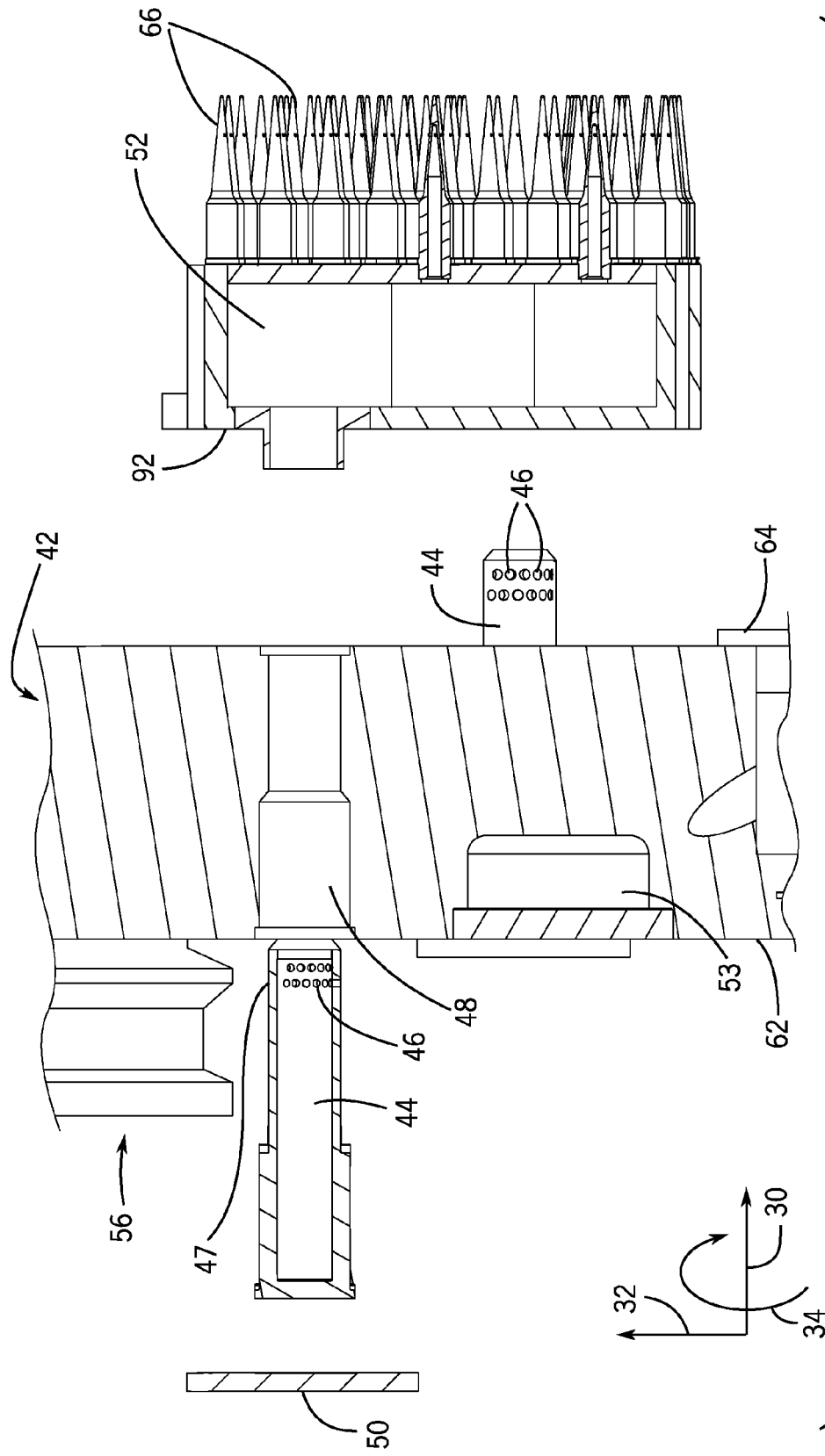
FIG. 5 is an exploded cross-sectional view of a portion of an end cover having the detachable fuel plenum of FIG. 4.

To illustrate the fuel plenum 52 removal, FIG. 5 shows an exploded side view of the end cover 42 having the cold face 62, the hot face 64, and the detachable fuel plenum 52. The illustrated embodiment includes the fuel manifold 53, the fuel inlet 56, the pre-orifice cavity 48, the pre-orifice cover 50, and the fuel injectors 66. As described in the previous figures, the fuel plenum 52 may be removably coupled to the hot face 64 of the end cover 42. For example, the fuel plenum 52 may be bolted to the hot face 64 of the end cover 42, and may include a seal 92, in order to block leakage across the interface of the fuel plenum 52 and the end cover 42. The fuel plenum 52 shown in FIG. 5 is fed fuel 14 by two pre-orifice conduits 44. The fuel 14 is then distributed to the fuel injectors 66. Each plenum 52 may contain a plurality of fuel injectors 66 (e.g., 2 to 1000, 3 to 500, 4 to 250, 5 to 100, or 10 to 50 fuel injectors 66) on the face 64 of the plenum 52 that faces the downstream side 58 of the fuel nozzle 12, and each fuel injector 66 may extend into a mixing tube 18. Each removable fuel plenum 52 may be uncoupled from the end cover 42, and in addition, each fuel injector 66 may be individually removed from the fuel plenum 52, for example by unbolting or unthreading. The ability to inspect, clean, and/or remove individual fuel plenums 52 may allow for a more modular, easily replaceable, and inspectable end cover 42. Furthermore, the fuel plenum 52 may provide uniform fuel distribution to the fuel injectors 66, resulting in lower emissions (NOx), reducing the thermal strains in the end cover 42, and increasing the robustness of the turbine system 10.

Figure 6:
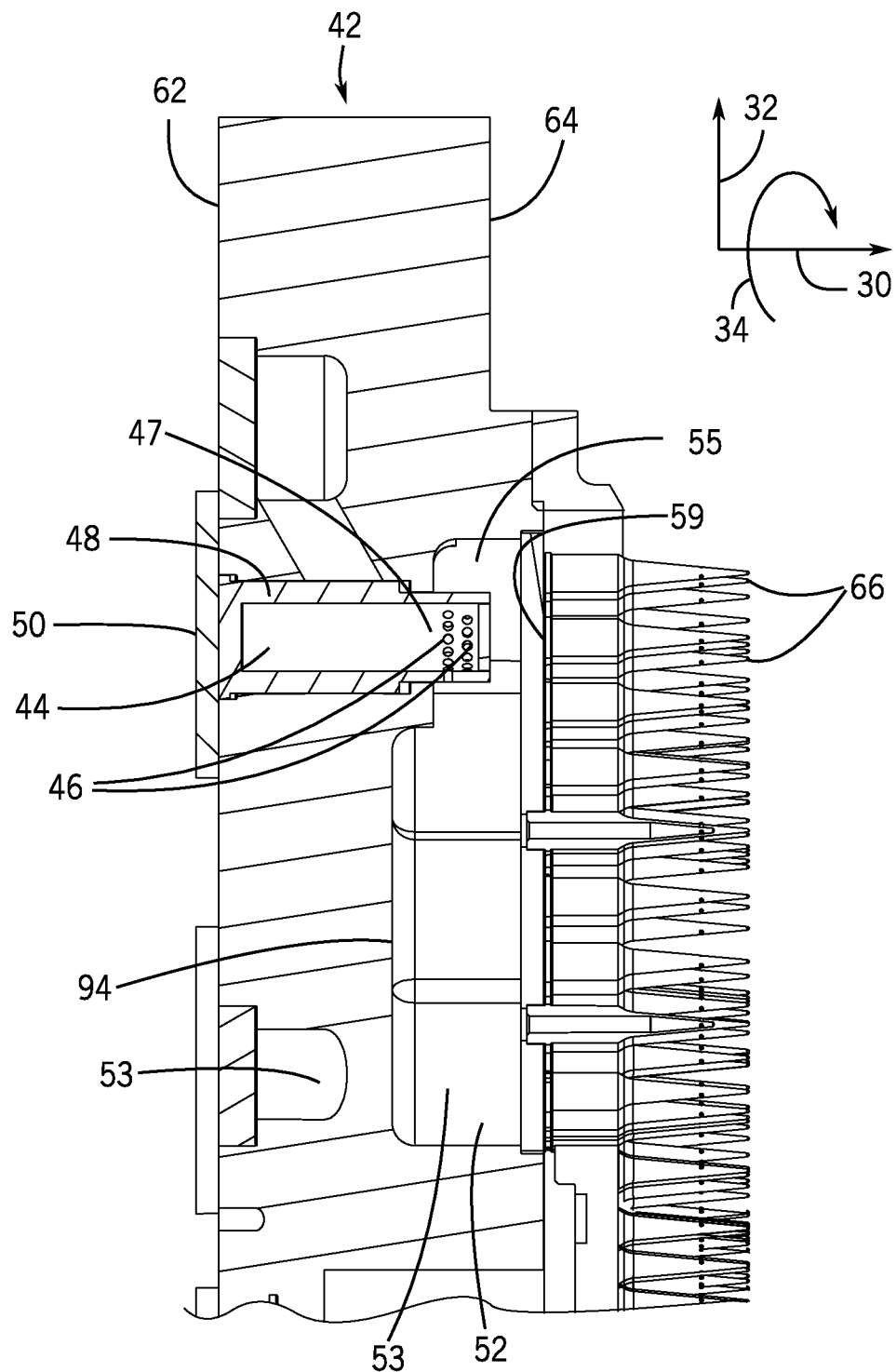
FIG. 6 is a cross-sectional side view of a portion of an end cover having an integral fuel plenum.

FIG. 6 shows a side view of an embodiment of the end cover 42, having the cold face 62, the hot face 64, and the integral fuel plenum 52. The illustrated embodiment includes the fuel injectors 66, the fuel manifold 53, the pre-orifice conduit 44, the pre-orifice conduit apertures 46, and the pre-orifice cover 50. As discussed above, the fuel manifold 53 may supply fuel 14 to the pre-orifice conduit 44, which may be loaded from the cold face 62 into the pre-orifice cavity 48. The integrated fuel plenum 52 is defined by a cavity 94 within the end cover 42, with sides 53, 55, and 57, and a side 59 with the fuel injectors 66 attached. As shown, a portion of the downstream end 47 of the pre-orifice conduit 44 may extend into the fuel plenum 52, and the fuel 14 may flow through the apertures 46 into the fuel plenum 52. The fuel plenum 52 may distribute the fuel 14 to a plurality of fuel injectors 66, which may be removably coupled (e.g., bolted, threaded, etc.) to the fuel plenum 52, and which point toward the downstream side 58 of the fuel nozzle 12 (along the axial axis 30). The integral fuel plenum 52 may be manufactured with the end cover 42 (e.g., one piece), so that there are no seams, welds, or other areas vulnerable to thermal stress or other strains between the fuel plenum 52 and the end cover 42. The pre-orifice cover 50 and the pre-orifice conduit 44 may be removed (e.g., unbolted, unthreaded, etc.) from the cold face 62 in order to allow for inspection, cleaning, and/or maintenance of the fuel plenum 52 and the pre-orifice conduit 44. As noted above, each end cover 42 may include one or more fuel plenums 52. The fuel plenum 52 may be a lower cost, more modular, and more easily replaceable and inspectable sub-assembly, and may provide a more reliable method to distribute fuel to the fuel injectors 66. The fuel plenum 52 may reduce thermal stress in the gas turbine 10 and may increase fuel distribution efficiency to each mixing tube 54 and fuel injector 66.

A perspective view of an embodiment of a detachable fuel plenum 52 is shown in FIG. 7. As shown, fuel plenum 52 has the shape of a truncated sector (e.g., is wedge-shaped, pie-shaped, etc.) and includes a plurality of fuel injectors 66. For example, the depicted fuel plenum 52 includes 72 fuel injectors 66. The fuel injectors 66 may be removably coupled (e.g., bolted, brazed, threaded, etc.) to the face 64 of the fuel plenum 52. Each fuel injector 66 may be individually remove from the plenum 52 for inspection, cleaning, and maintenance. The fuel plenum 52 may extend in a radial 32 direction from the inner circumference 91 to the outer circumference 93 of the end cover 42, and may be attached to the end cover 42 by fasteners, such as bolts disposed in bolt receptacles 90, which may secure the fuel plenum 52 at various corners or edges to the end cover 42. The inner circumference 91 and the outer circumference 93 may have varying lengths, which may determine the size of the fuel plenum 52. For example, if a fuel nozzle 12 has many fuel plenums 52, each fuel plenum 52 may have smaller inner circumferences 91 and outer circumferences 93. Furthermore, the plenums 52 may partially extend circumferentially 34 around the fuel nozzle 12. The fuel injectors 66 may be arranged circumferentially (as shown), radially, in a close-packed (e.g., hexagonal) pattern, or in any other suitable arrangement. Each end cover 42 may include one or more fuel plenums 52, which may together provide a volume for pre-mixing the fuel for the fuel injectors 66.

Described above is a system that includes an end cover 42 of a combustor for a gas turbine. The end cover 42 has at least one fuel plenum 52 coupled to a plurality of fuel injectors 66 for a multi-tube fuel nozzle, wherein at least one fuel plenum 52 is configured to provide fuel 14 to each of the fuel injectors 66. The fuel plenum 52 may be a lower cost, more modular, and more easily replaceable and inspectable sub-assembly, and may provide a more reliable method to distribute fuel to the fuel injectors 66. The fuel plenum 52 may reduce thermal stress in the gas turbine 10 and may increase fuel distribution efficiency to each mixing tube 54 and fuel injector 66.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
    a multi-tube fuel nozzle of a combustor for a gas turbine engine, wherein the multi-tube fuel nozzle comprises a plurality of fuel-air mixing tubes and a plurality of fuel injectors, wherein each tube of the plurality of fuel-air mixing tubes has one of the fuel injectors;
    an end cover of the combustor having a first end and a second end disposed opposite the first end;
    at least one fuel plenum defined by a first wall, a second wall disposed opposite the first wall, and a third wall extending between the first wall and second walls, wherein an entirety of the at least one fuel plenum is removable from the end cover, the first wall contacts the second end of the end cover when the at least one plenum is coupled to the end cover, and the second wall is coupled to the plurality of fuel injectors, and wherein the at least one fuel plenum is configured to provide fuel to each of the plurality of fuel injectors.

2. The system of claim 1, wherein the plurality of fuel injectors are brazed onto the second wall.

3. The system of claim 1, wherein the end cover comprises a pre-orifice cavity extending through the end cover from the first end to the second end, the end cover comprises a pre-orifice conduit structure disposed within the pre-orifice cavity, wherein the pre-orifice conduit structure comprises a first end portion and a second end portion, the first end portion disposed adjacent the first end and the second end portion extends through the second end of the end cover and into the at least one fuel plenum, and the pre-orifice conduit structure is configured to provide fuel to the at least one fuel plenum via a plurality of apertures disposed on a lateral wall of the pre-orifice conduit structure adjacent the second end portion.

4. The system of claim 1, wherein the end cover comprises an inner circumference and an outer circumference, and wherein the at least one fuel plenum has a wedge shape and extends in a circumferential direction about a central axis of the end cover, and the at least one fuel plenum has a greater length in the circumferential direction between the second wall adjacent the outer circumference than the second wall adjacent the inner circumference.

5. The system of claim 1, wherein the end cover comprises an inner circumference and an outer circumference, and the at least one fuel plenum extends in a radial direction from the inner circumference to the outer circumference of the end cover.

6. The system of claim 1, comprising the combustor or the gas turbine engine having the multi-tube fuel nozzle and the end cover.

7. A system comprising:
    an end cover of a combustor having a first side and a second side, comprising:
        at least one fuel plenum integral to the end cover, wherein the at least one fuel plenum is configured to couple to a plurality of fuel injectors of a multi-tube fuel nozzle having a plurality of fuel-air mixing tubes, wherein each tube of the plurality of fuel-air mixing tubes has one of the plurality of fuel injectors, wherein the at least one fuel plenum is configured to provide a fuel to the plurality of fuel injectors;
a pre-orifice cavity extending through the end cover from the first side to the second side; and
a pre-orifice conduit structure disposed within the pre-orifice cavity, wherein the pre-orifice conduit structure comprises a first end portion and a second end portion, the first end portion disposed adjacent the first side and the second end portion extends through the second side of the end cover and into the at least one fuel plenum, and the pre-orifice conduit structure is configured to provide the fuel to the at least one fuel plenum via a plurality of apertures disposed on a lateral wall of the pre-orifice conduit structure adjacent the second end portion.

8. The system of claim 7, wherein the at least one fuel plenum is at least partially defined by a cavity within the end cover.

9. The system of claim 8, comprising a support plate coupled to the plurality of fuel injectors, wherein the at least one fuel plenum is further defined by the support plate.

10. The system of claim 7, wherein the plurality of fuel injectors are brazed onto the at least one fuel plenum.

11. The system of claim 7, wherein the at least one fuel plenum extends circumferentially about a central axis of the end cover.

12. The system of claim 7, wherein the end cover comprises an inner circumference and an outer circumference, and the at least one fuel plenum extends in a radial direction from the inner circumference to the outer circumference of the end cover.

13. A system comprising:
at least one fuel plenum configured to attach to an end cover of a gas turbine combustor, wherein the at least one fuel plenum is defined by a first wall, a second wall disposed opposite the first wall, and a third wall extending between the first and second walls,
wherein the first wall contacts a surface of the end cover when the at least one plenum is attached to the end cover, and the second wall is coupled to a plurality of fuel injectors for a multi-tube fuel nozzle,
wherein the end cover comprises a pre-orifice cavity extending through the end cover from a first end to a second end of the end cover, the end cover comprises a pre-orifice conduit structure disposed within the pre-orifice cavity, wherein the pre-orifice conduit structure comprises a first end portion and a second end portion, the first end portion disposed adjacent the first end and the second end portion extends through the second end of the end cover and into the at least one fuel plenum, and the pre-orifice conduit structure is configured to provide fuel to the at least one fuel plenum via a plurality of apertures disposed on a lateral wall of the pre-orifice conduit structure adjacent the second end portion, and
wherein the at least one fuel plenum is configured to provide a fuel to the plurality of fuel injectors.

14. The system of claim 13, comprising the gas turbine combustor or a gas turbine engine having the at least one fuel plenum.

* * * * *